(12) United States Patent
Wood et al.

(10) Patent No.: US 7,512,457 B2
(45) Date of Patent: Mar. 31, 2009

(54) IN-PROCESS NON-CONTACT MEASURING SYSTEMS AND METHODS FOR AUTOMATED LAPPING SYSTEMS

(75) Inventors: Jeffrey H Wood, Eureka, MO (US); Thomas R Berkel, Troy, IL (US); Robert E Bender, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/682,679

(22) Filed: Mar. 6, 2007

(65) Prior Publication Data

US 2008/0216336 A1 Sep. 11, 2008

(51) Int. Cl.
*G06F 19/00* (2006.01)
(52) U.S. Cl. .................. 700/175; 356/625; 356/629; 700/57; 700/95; 700/248; 901/6; 901/47
(58) Field of Classification Search ............ 356/23–26, 356/625, 629, 631, 634; 451/5, 92, 1, 8, 451/41; 700/56–61, 245–248, 175, 186, 700/195, 63, 95–98, 108–109, 159–160, 700/163; 702/33–36, 81–84, 127, 150–159, 702/167–172
See application file for complete search history.

(56) References Cited

U.S. PATENT DOCUMENTS

| | | | | |
|---|---|---|---|---|
| 4,956,764 A | * | 9/1990 | Carver et al. .................. 700/59 |
| 6,277,207 B1 | * | 8/2001 | Gauthier ...................... 134/18 |
| 6,921,317 B2 | * | 7/2005 | Wood et al. .................... 451/5 |
| 7,120,524 B2 | * | 10/2006 | Srack et al. ................... 701/33 |
| 2002/0072297 A1 | * | 6/2002 | Kennerknecht et al. ........ 451/5 |
| 2002/0121291 A1 | * | 9/2002 | Daum et al. ................... 134/8 |
| 2004/0065349 A1 | * | 4/2004 | Scheiter, Jr. .................. 134/18 |
| 2004/0180136 A1 | * | 9/2004 | Nagase et al. ............... 427/154 |
| 2006/0111813 A1 | * | 5/2006 | Nishiyama .................. 700/253 |
| 2006/0161382 A1 | * | 7/2006 | Kaneyasu et al. ........... 702/168 |

* cited by examiner

*Primary Examiner*—Paul L Rodriguez
*Assistant Examiner*—Carlos Ortiz Rodriguez
(74) *Attorney, Agent, or Firm*—Lee & Hayes, PLLC

(57) ABSTRACT

In-process non-contact measurement systems and methods for automated lapping systems are disclosed. In an embodiment, a moveable frame can be controllably positioned proximate to a lapped work product. A control component can provide first control signals to control a movement of the moveable frame relative to the lapped work product. A non-contact measuring device can be coupled to the moveable frame measures a surface of the lapped work product and can transmit measurement data of the surface of the lapped work product to the control component. The control component can further provide second control signals to control a movement of the non-contact measuring device relative to the moveable frame.

20 Claims, 4 Drawing Sheets

IN-PROCESS NON-CONTACT MEASURING SYSTEMS AND METHODS FOR AUTOMATED LAPPING SYSTEMS

FIELD OF THE INVENTION

The present disclosure generally relates to measurement systems, and more specifically to in-process non-contact measurement systems and methods for automated lapping systems.

BACKGROUND OF THE INVENTION

Acquiring high quality polished and lapped injection molds requires exacting surface finish and surface form. Surface finish is quantified visually, however, surface form must be measured. Historically, injection molds were measured using hand-held gauging devices. The gauging devices scanned the surface of the injection mold by remaining in contact with rounded diamond tips that were directly in contact with the surface of the injection mold. When the diamond tips were removed from the surface, the surface may be either damaged or may require additional surface polishing of the injection mold to remove any contact paths.

The present state of the measuring art requires significant downtime of the automated lapping system, hence, the measurement process of the injection mold is reserved for the final stages of the mold finishing for confirmation of shape compliance only. Therefore, measuring systems and methods for automated lapping systems which progressively perform measurements that reduce down time, offer real-time lapping progress, and reduce the possibility of marring the surface would have utility.

SUMMARY OF THE INVENTION

Embodiments of measuring systems and methods for automated lapping systems in accordance with the disclosure are configured to mitigate the undesirable characteristics of prior measuring devices for an injection mold in an automatic lapping system described above. Thus, embodiments of systems and methods in accordance with the teachings of this disclosure may advantageously provide improved time efficiency and quality, reduce costs, and improved measuring of an injection mold in an automated lapping system in comparison with the prior art.

In one embodiment, a measurement system for an automated lapping system includes a moveable frame, a control component, and a non-contact measuring device. The moveable frame can be controllably positioned proximate to a lapped work product. The control component provides first control signals to control a movement of the moveable frame relative to the lapped work product. The non-contact measuring device coupled to the moveable frame measures a surface of the lapped work product and transmits measurement data of the surface of the lapped work product to the control component. The control component further provides second control signals to control a movement of the non-contact measuring device relative to the moveable frame.

In another embodiment, a measurement system for an automated lapping system includes a moveable frame, a non-contact measuring device, and a control component. The moveable frame positions itself relative to one or more lapped work products. The moveable frame incorporates into an automated lapping system. The control component controls the moveable frame. The non-contact measuring device measures a surface of each of the one or more lapped work products and transmits measurement data of the surface to the control component.

In another embodiment, a method for performing non-contact measurements of the surface of a lapped work product during an automated lapping process includes moving a non-contact measuring device relative to the lapped work product; measuring the surface of the lapped work product using the non-contact measuring device to collect measurement data; analyzing the measurement data to determine whether the lapped work product contains areas where additional lapping is required; and if additional lapping is required, resuming the lapping of the work product in the designated areas where additional lapping is required.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Embodiments of the present invention are described in detail below with reference to the following drawings. The same numbers are used throughout the drawings to reference like features and components.

DETAILED DESCRIPTION

Embodiments of the present invention relate to measuring systems and methods for automated lapping systems. Many specific details of certain embodiments of the invention are set forth in the following description and in FIGS. 1-4 to provide a thorough understanding of such embodiments. One skilled in the art, however, will understand that the present invention may have additional embodiments, or that the present invention may be practiced without several of the details described in the following description.

Figure 1:
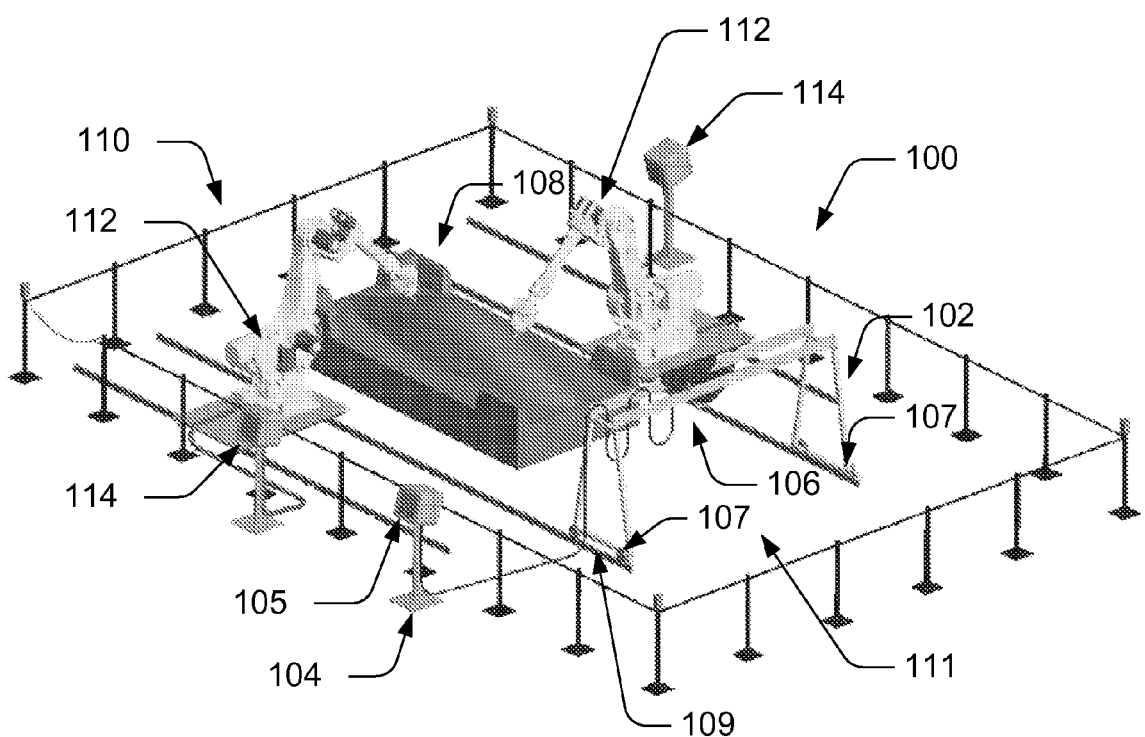
FIG. 1 illustrates an example of an in-process non-contact measuring system in accordance with an embodiment of the present invention.

FIG. 1 illustrates an example of an in-process non-contact measuring system 100 in accordance with an embodiment of the present invention. The system 100 includes a moveable frame 102, a control component 104, and a non-contact measuring device 106 to measure a surface of a lapped work product 108 and transmit measurement data of the surface of the lapped work product 108 to the control component 104. In this example, the moveable frame 102 can be incorporated into an automated lapping system 110. The control component 104 can control the moveable frame 102 and can position the moveable frame 102 relative to the lapped work product 108.

As shown in FIG. 1, the automated lapping system 110 may include one or more lapping robots 112 operatively coupled to one or more controllers 114 and that are positioned proximate to the work product 108 to perform automated lapping operations. The automated lapping system 110 may operate in accordance with generally known lapping operations which, for the sake of brevity, will not be described in detail herein. For example, in some embodiments, the automated lapping system 110 may operate as described in U.S. Pat. No. 6,921,317 issued to Wood et al., and in U.S. Pat. No. 7,118,452 issued to Wood, which patents are incorporated herein by reference.

The moveable frame 102 can be positioned proximate to the lapped work product 108. In an embodiment, the moveable frame 102 can be positioned relative to a plurality of lapped work products 108. In a further embodiment, the moveable frame 102 can freely move in all directions. As shown in FIG. 1, the moveable frame 102 can include rolling devices 107, such as wheels, that can travel and/or be installed on guide rails 109 of the automated lapping system 110. Also in this embodiment, the moveable frame 102 can be stowed in a resting position 111 as the lapping process occurs.

The control component 104 can controllably move the moveable frame 102 in order to scan the non-contact measuring device 106 over the work product 108. In some embodiments, the control component 104 can control the moveable frame 102 responsive to the measurements of the surface of the lapped work product 108. The control component 104 can also control the non-contact measurement device 106, including both the movement of the measurement device 106 relative to the moveable frame 102 and the data measurement activities of the measurement device 106. In some embodiments, the control component 104 can control the non-contact measurement device 106 responsive to the measurements of the surface of the lapped work product 108. In a particular embodiment, the control component 104 can simultaneously control the non-contact measurement device 106 and the moveable frame 102 responsive to the measurement of the surface of the lapped work product 108.

In other embodiments, the control component 104 can control the moveable frame 102 responsive to the measurements of the surface of a plurality of lapped work products 108. Similarly, the control component 104 can be configured to control the non-contact measurement device 106 and the moveable frame 102 responsive to the measurements of the surface of the plurality of lapped work products 108, either simultaneously or sequentially, or combinations of both. In another embodiment, the control component 104 can also collect the measurement data recorded by the measurement device 106.

In a further embodiment, the control component 104 includes a user interface 105 and a processor. In this embodiment, the user interface 105 can provide a display for a user to view the measurement data that is received from the non-contact measuring device 106. Further in this embodiment, the processor can be used by the control component 104 to receive information about the shape or dimensions of the lapped work product 108.

Figure 2:
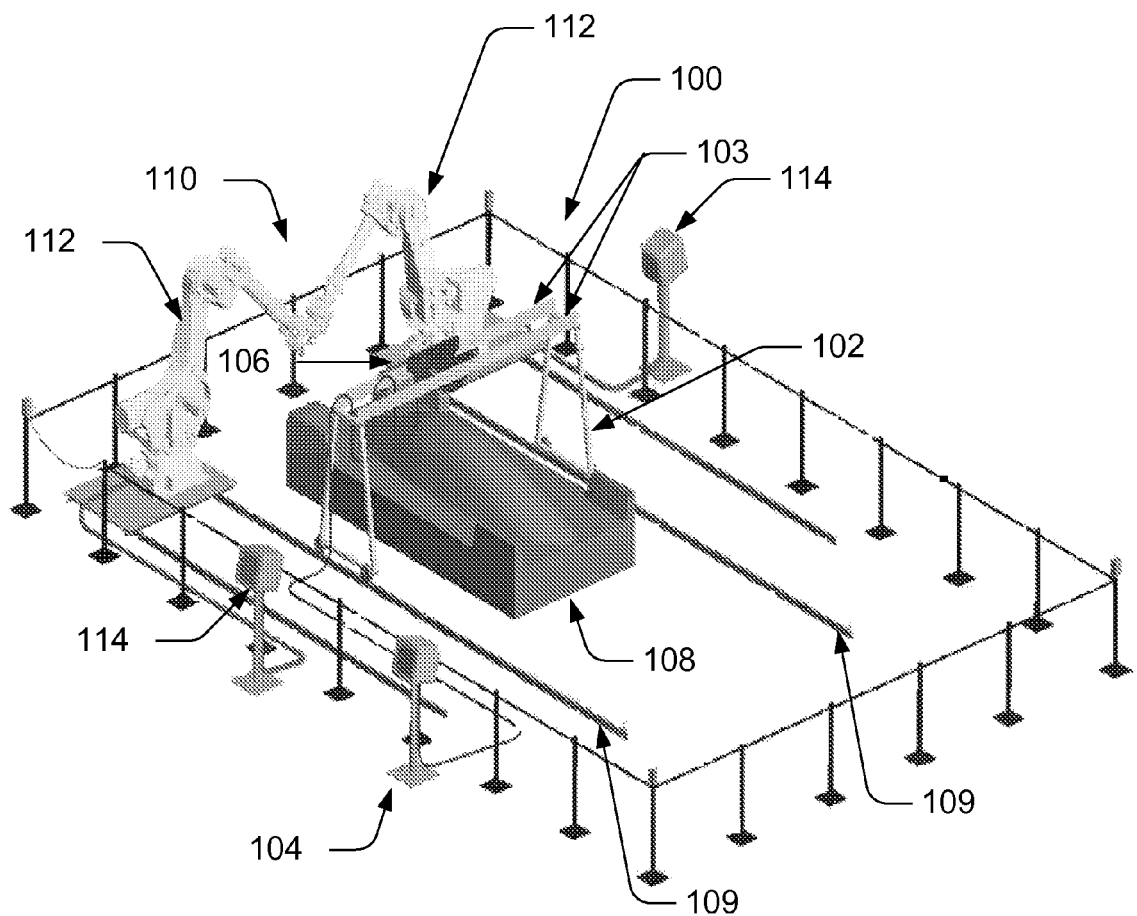
FIG. 2 illustrates a farther example of an in-process non-contact measuring system in accordance with an embodiment of the present invention.

FIG. 2 illustrates the in-process non-contact measuring system 100 of FIG. 1 in an operating position 103 over the work product 108. In operation, the non-contact measuring device 106 can measure the surface of the lapped work product 108 and transmit measurement data of the surface of the lapped work product 108 to the control component 104. The non-contact measurement device 106 can removeably attach to the moveable frame 102, and can move laterally and/or vertically along the moveable frame 102 to obtain measurements of the surface of the lapped work product 108. The movements of the frame 102 along the rails 109 (e.g. along an x axis), and movements of the non-contact measuring device 106 laterally along one or more horizontal portions 103 of the frame 102 (e.g. along an y axis) and vertically toward or away from the work product 108 (e.g. along a z axis), can be controlled by the control component 104.

In some embodiments, the control component 104 may be in communication with the controllers 114 of the automated lapping system 110 to coordinate the movements of the various components of the measuring and lapping systems 100, 110 in a cooperative manner. Thus, the non-contact measuring system 100 may perform measurements of the work product 108 either sequentially or simultaneously with the operation of the automated lapping system 110. In a particular embodiment, a non-contact measuring system 100 may perform measurements over a portion of the work product 108 while the automated lapping system 10 performs lapping operations on another portion of the work product 108.

In some embodiments, the non-contact measuring device 106 can be a sensor, laser, laser based profilometer or confocal chromatic displacement device, or any other suitable sensing system. In one particular embodiment, the non-contact measuring device 106 may be a device such as those commercially available by Micro-Epsilon of Raleigh, N.C. Further, in this embodiment, the non-contact measuring device 106 can be integrated into a measuring system by an integrator such as those commercially available by AIM (American Industrial Metrology Inc.) of Hamilton, Ohio. Also, in this embodiment, the measurement data of the non-contact measuring device 106 can be reduced into a useful graphical illustrations using software code such as the software written by ISC (Industrial Software and Control, LTD) of West Chester, Ohio.

In another embodiment, the non-contact measuring device 106 can measure the surface of the plurality lapped work products 108 and transmit measurement data of the surface of the plurality of lapped work products 108 to the control component 104. In still another embodiment, the non-contact measuring system 100 is integrated into the automated lapping system 110. Thus, the functionality of the control component 104 and the controllers 114 can be combined into a single control unit that controls all of the components of the lapping and measuring systems 110, 100.

Figure 3:
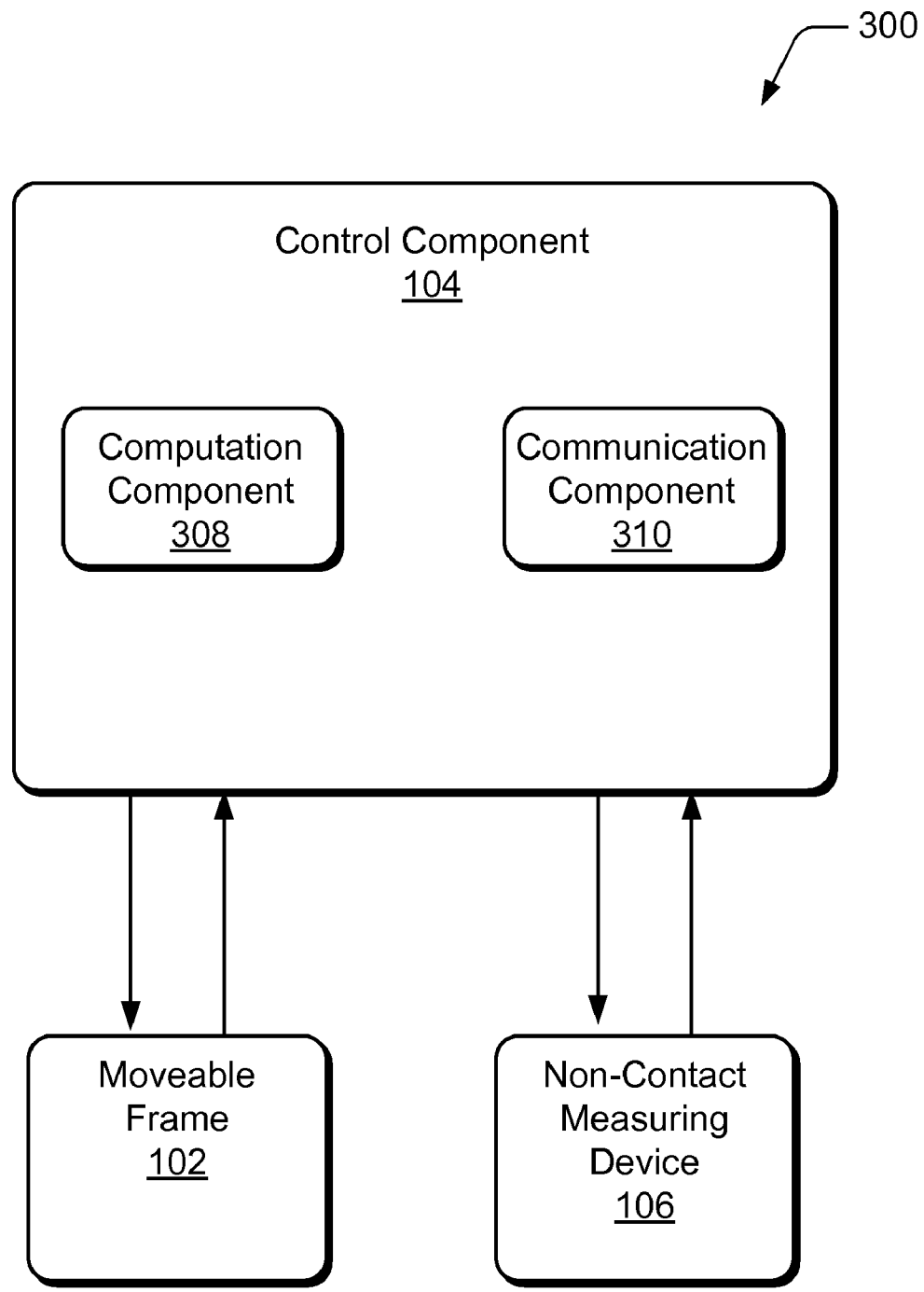
FIG. 3 is a block diagram of a further example of an in-process non-contact measuring system in accordance with an embodiment of the present invention.

FIG. 3 is a block diagram of a further example of an in-process non-contact measuring system 300 in accordance with an embodiment of the present invention. The aspects of FIG. 3 were discussed in reference to FIGS. 1 and 2. The system 300 includes a moveable frame 102, a control component 104, and a non-contact measuring device 106. The control component 104 can include a computation component 308 and a communication component 310. In some embodiments, the control component 104 can include a communication component 310 that can receive the measurement data from the non-contact measuring device 106, and output the measurement data to any other desired component or system. In another embodiment, the control component 104 can include a computation component 308 that can analyze the measurement data, and determine whether an area of the lapped work product 108 requires additional lapping. Further in this embodiment, the control component 104 can activate one or more of the robots 112 in the automated lapping system 110 to lap the area of the lapped worked product 108 requiring additional lapping.

Generally, any of the functions and methods described herein can be implemented using hardware, software, firmware (e.g., fixed logic circuitry), manual processing, or any combination thereof. A software implementation represents program code that performs specified tasks when executed on a computing-based processor. Example method 400 described with reference to FIG. 4 may be described in the general context of computer executable instructions. Generally, computer executable instructions can include applications, routines, programs, objects, components, data structures, procedures, modules, functions, and the like that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices. Further, the features described herein are platform-independent such that the techniques may be implemented on a variety of computing platforms having a variety of processors.

Figure 4:
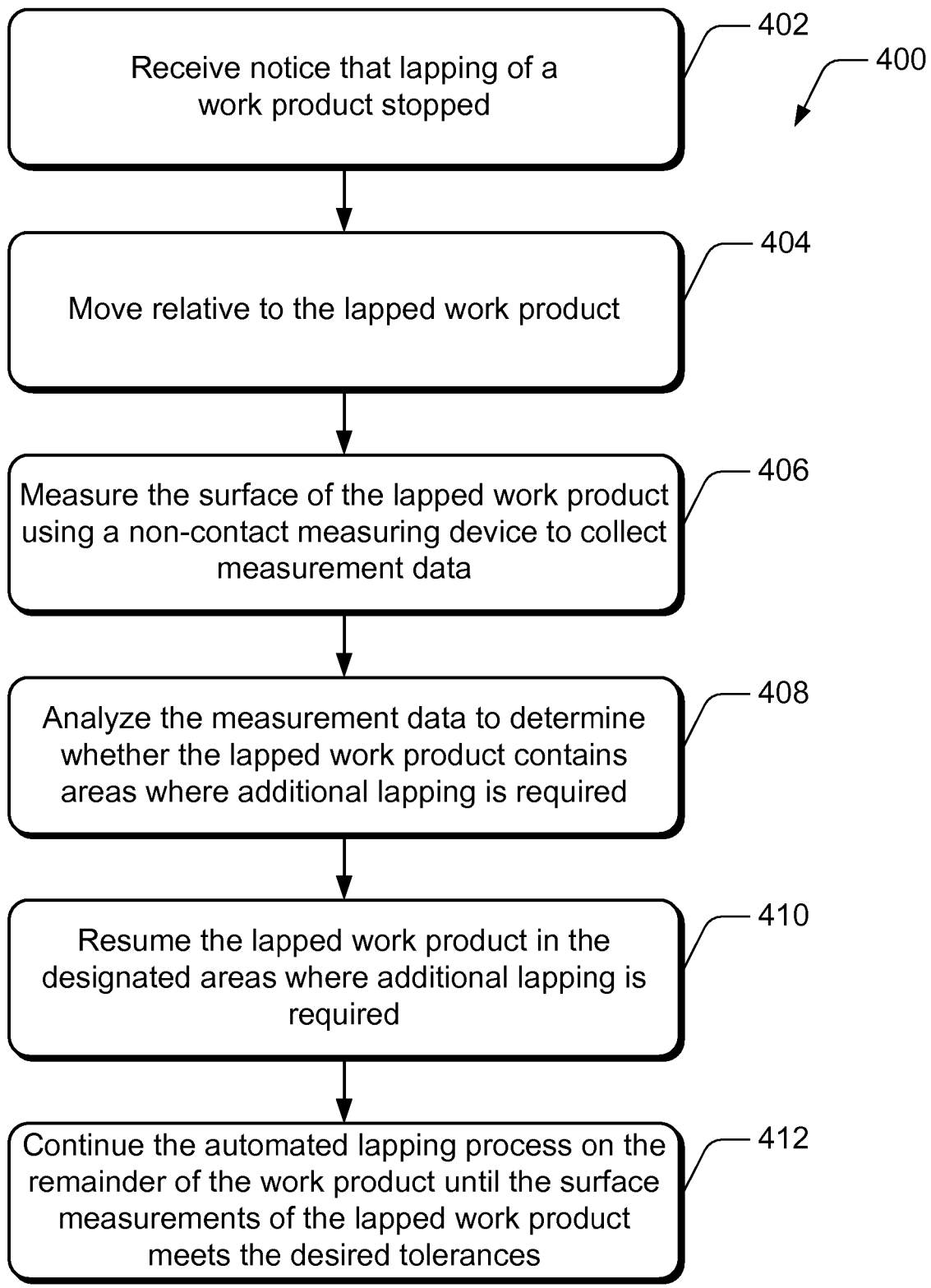
FIG. 4 is a flowchart showing an in-process non-contact measuring method for automated lapping systems.

FIG. 4 is a flowchart showing an in-process non-contact measuring method 400 for automated lapping systems and is described with reference to the exemplary systems described above, including those specific embodiments shown in FIG. 1, 2, and 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At an optional block 402, notice is received that lapping of a work product stopped. For example, the control component 104 may receive notice that lapping of a work product 108 stopped. Alternately, block 402 may be omitted, and one or more of the following operations may be performed as lapping of the work product is occurring. At block 404, the position of the measuring device 106 is adjusted relative to the lapped work product along one or more of the x, y, and z axes. For example, the moveable frame 102 may move relative to the lapped work product 108 along the rails 109 (e.g. along the x axis), and the measuring device 106 may move along one or more horizontal portions 103 of the frame 102 (e.g. along the y axis) and vertically toward or away from the work product 108 (e.g. along the z axis). At block 406, the surface of the lapped work product is measured using a non-contact measuring device to collect measurement data.

In some embodiments, the moving of the measuring device 106 (block 404) and the acquisition of the measurement data (block 406) occurs simultaneously, in the manner of a real-time measurement scan. Further, in additional embodiments, one or both of the moving (block 404) and the measuring (block 406) occurs over one portion of the work product at the same time that lapping operations are being performed on another portion of the work product.

At block 408, the measurement data is analyzed to determine whether the lapped work product contains areas where additional lapping is required. For example, the control component 104 may analyze the measurement data to determine whether the lapped work product 108 contains areas where additional lapping is required. At block 410, additional lapping of the work product may be performed or resumed in the designated areas where additional lapping is required. For example, the lapping robots 112 of the automated lapping system 110 may perform or resume lapping of the work product 108 in the designated area where additional lapping is required, such as by returning from lapping another portion of the work product to the designate areas.

At block 412, the automated lapping process 400 may be performed or continued on the remainder of the work product until the surface measurements of the lapped work product meets the desired tolerance level. For example, the automated lapping system 110 resume or continue the automated lapping process on the remainder of the work product 108 until the surface measurements of the lapped work product 108 meets the desired tolerance level. The actions described above with respect to blocks 404 through 412 may then be repeated indefinitely until the process 400 is complete.

Although embodiments of measuring systems and methods for automated lapping systems have been described in language specific to structural features and/or methods, it is to be understood that the subject of the appended claims is not necessarily limited to the specific features or methods described. Rather, the specific features and methods are disclosed as exemplary implementations of measuring systems and methods for an automated lapping system.

The invention claimed is:

1. A measurement system for an automated lapping system, the measurement system comprising:
a moveable frame configured to be controllably positioned proximate to a lap work product; a non-contact measuring device coupled to the moveable frame and configured to measure a surface of the lap work product; a lapping robot configured to move proximate to and lap the lap work product, the lapping robot not attached to the moveable frame and the non-contact measuring device; a first control component configured to control a movement of the lapping robot; a second control component configured to receive measurement data of the surface of the lap work product from the non-contact measuring device, and to provide first control signals to control a movement of the moveable frame relative to the lap work product, and a second control signal to control a movement of the non-contact measuring device laterally or vertically along the moveable frame, wherein the first control component and the second control component are further configured to coordinate the movement of the lapping robot and the non-contact measuring device so that the lapping robot pivots in a first direction to lap a first surface area of the lap work product while the non-contact measuring device simultaneously moves in a second direction to measure a second surface area of the lap work product.

2. The system of claim 1, wherein the automated lapping system includes a pair of rails, and wherein the moveable frame is configured to be moveably engaged with the pair of rails, the first control signals being configured to control the movement of the moveable frame along the pair of rails.

3. The system of claim 2, wherein the second control component includes a computation component configured to analyze the measurement data, and determine whether an area of the lap work product requires additional lapping.

4. The system of claim 3, wherein the second control component activates the lapping robot in the automated lapping system to lap the area of the lap work product requiring additional lapping.

5. The system of claim 1, wherein the second control component is further configured to control the moveable frame responsive to the measurement data of the surface of the lap work product.

6. The system of claim 1, wherein the second control component is further configured to control performance of measurements using the non-contact measurement device.

7. The system of claim 6, wherein the second control component is further configured to control the non-contact measurement device responsive to the measurement data of the surface of the lap work product.

8. The system of claim 6, wherein the second control component is further configured to control the non-contact measurement device and the moveable frame responsive to the measurement data of the surface of the lap work product.

9. The system of claim 1, wherein the measurement device includes at least one of a sensor, a laser, a laser based profilometer, and a confocal chromatic displacement device.

10. A method for performing non-contact measurements of a surface of a lap work product during an automated lapping process, comprising:

providing a non-contact measuring device that is removeably attached to a moveable frame; wherein the non-contact measuring device is controlled to move laterally or vertically along the moveable frame, providing a lapping robot that is not attached to the moveable frame and the non-contact measuring device; moving the non-contact measuring device in a first direction relative to the lap work product using a first controller component; moving the lapping robot in a second direction relative to the lap work product using a second controller component; measuring the surface of the lap work product using the non-contact measuring device to collect measurement data;

analyzing the measurement data to determine whether the lap work product contains areas where additional lapping is required; and if additional lapping is required, moving the lapping robot to resume the lapping of the work product in the designated areas where additional lapping is required, wherein the first controller and the second controller are coordinated so that the movement of the non-contact measuring device in the first direction and the movement of the lapping robot in the second direction occur simultaneously.

11. A method as recited in claim 10, further comprising continuing the automated lapping process on the remainder of the work product until the surface measurements of the lap work product meets a desired tolerance level.

12. A method as recited in claim 10, wherein the moving of the non-contact measuring device is responsive to the measuring of the surface.

13. A method as recited in claim 10, wherein the measuring of the surface occurs simultaneously with the moving of the non-contact measuring device.

14. A method as recited in claim 13, wherein the moving of the non-contact measuring device includes moving the non-contact measuring device relative to the moveable frame.

15. A measurement system for an automated lapping system, the measurement system comprising:

a pair of guide rails; a moveable frame configured to position itself relative to one or more lap work products, the moveable frame configured to move along the guide rails; a non-contact measuring device removeably attached to the moveable frame and configured to measure a surface of each of the one or more lap work products and transmit measurement data of the surface to the first control component; wherein the non-contact measuring device is controlled to move laterally or vertically along the moveable frame; a lapping robot configured to move along at least one of the guide rails to lap one or more lap work products, the lapping robot not attached to the moveable frame and the non-contact measuring device; a first control component configured to control the moveable frame; and a second control component configured to control the lapping robot, wherein the first control component and the second control component are further configured to coordinate the movement of the lapping robot and the moveable frame so that the lapping robot pivots in a first direction to lap a first surface area of each lap work product while the non-contact measuring device simultaneously moves in a second direction to measure a second surface area of each lap work product.

16. The system of claim 15, wherein the first control component includes a communication component configured to receive the measurement data from the non-contact measuring device.

17. The system of claim 15, wherein the first control component includes a computation component configured to analyze the measurement data, and determine whether an area of the surface of each of the one or more lap work products requires additional lapping.

18. The system of claim 17, wherein the first control component is configured to activate the lapping robot in the automated lapping system to lap the area requiring additional lapping.

19. The system of claim 15, wherein the first control component is configured to control at least one of a position and a measurement activity of the non-contact measurement device responsive to the measurements of each of the surfaces of the one or more lap work products.

20. The system of claim 19, wherein the first control component is configured to control the non-contact measurement device and the moveable frame responsive to the measurement of each of the surfaces.

* * * * *